(No Model.)
J. M. CLARK.
CAR COUPLING.
No. 387,395. Patented Aug. 7, 1888.
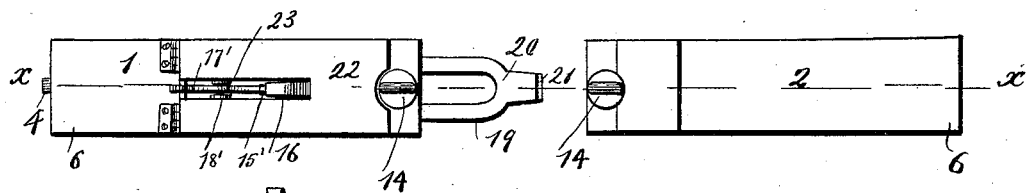
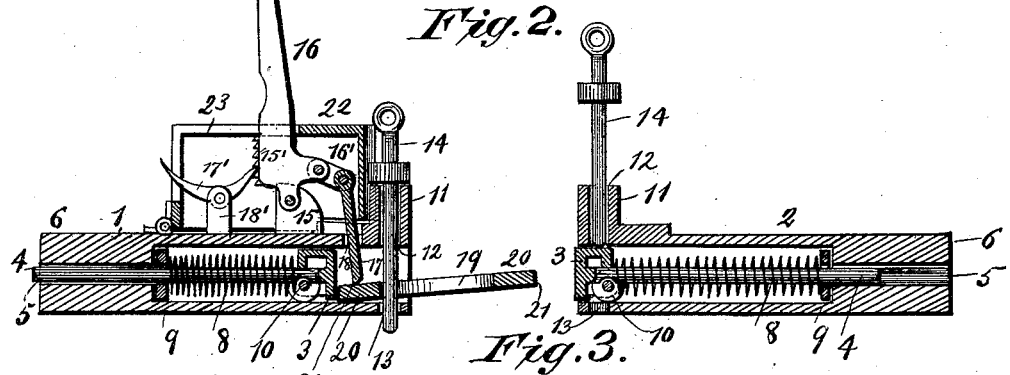
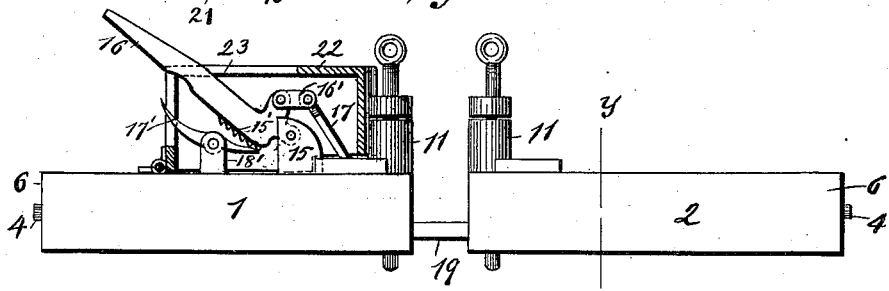
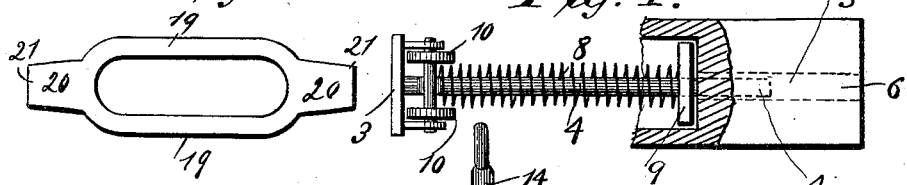
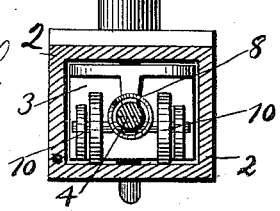
WITNESSES:
Phil C. Dietrich
C. Sedgwick
INVENTOR:
J. M. Clark
BY Munn & Co
ATTORNEYS.

UNITED STATES PATENT OFFICE.

JOHN M. CLARK, OF HEBRON, NEW YORK.

CAR-COUPLING.

SPECIFICATION forming part of Letters Patent No. 387,395, dated August 7, 1888.

Application filed January 9, 1888. Serial No. 260,182. (No model.)

*To all whom it may concern:*

Be it known that I, JOHN M. CLARK, of Hebron, in the county of Washington and State of New York, have invented a new and Improved Car-Coupling, of which the following is a full, clear, and exact description.

This invention relates to an improvement in car-couplings, and has for its object to provide a car-coupling in which the coupling pin and link are held in position to be coupled and the pin automatically dropped into engagement with the link.

The invention consists in a car-coupling constructed and arranged as hereinafter described and claimed.

Reference is to be had to the accompanying drawings, forming a part of this specification, in which similar figures of reference indicate corresponding parts in all the views.

Figure 1 is a plan view of the coupling in position to be coupled. Fig. 2 is a side view thereof in vertical section on the line $x\ x$, Fig. 1. Fig. 3 is a side view, with a portion in section, of the parts coupling. Fig. 4 is a detail showing the coupling-pin operating mechanism from the under side. Fig. 5 is a transverse section of the coupling on the line $y\ y$, Fig. 3; and Fig. 6 represents the coupling-link.

In the construction of this device hollow draw-bars 1 and 2 are employed, each containing a slide, 3, having a guide-rod, 4, with its end projecting into and adapted to move in a perforation, 5, in the solid end 6 of draw-bars 1 and 2. A coiled spring, 8, is mounted on guide-rod 4, having its ends bearing on the rear of slide 3 and against a washer, 9, which abuts against the solid end 6. To permit the slide 3 to move freely, it is preferably provided with friction-rollers 10.

The forward end of the draw-bars 1 and 2 is provided with a projection, 11, having a hole, 12, in line with a hole, 13, beneath in the draw-bar to receive a coupling-pin, 14. The slide 3 is held by the action of the spring 8 beneath the hole 12, and supports a coupling-pin, 14, in hole 12 in position, as shown at the right hand in Fig. 2.

To a bracket, 15, on draw-bar 1 is pivoted a lever, 16, connecting, by a pivoted link, 16', with a bar, 17, adapted to move into the draw-bar through a slot, 18, and bear down upon the end of a link, 19, to tilt it into inclined position, as shown in the left hand of Fig. 2, to be guided into the meeting draw-head 2. The bar 17 is also adapted to be moved in front of slide 3 to hold it in rear of hole 12, if desired. The lever 16 is held in upright position by a pawl, 17', pivoted to a post, 18', and engaging teeth 15' on lever 16.

The link 19 is made flat, as shown, or may be round, and is formed with the projection 20, having squared ends 21 to form a steady bearing against slides 3. By means of the projections 20 the link 19 may be acted upon, as above described, to raise it into position.

The edge of bar 17 is beveled or formed with a sharp edge, 21, to take hold of link 19 and prevent it from slipping. The lever 16, link 16', and bar 17 are covered by a casing, 22, hinged or otherwise detachably secured to draw-bar 1, and having a slot 23, through which lever 16 projects and is adapted to move freely.

In operation the slide 3 in draw-bar 1 is pushed back by link 19, the coupling-pin 14 dropped into holes 12 and 13, and the lever 16 thrown up to force bar 17 against projection 20 of link 19 and tilt the latter into position to be coupled, all as shown at the left hand of Fig. 2.

Upon the draw-head 1, advancing and meeting draw-head 2, the outer projection, 20, will bear against the slide 3, supporting coupling-pin 14, which has been placed in position in hole 12, as shown at the right in Fig. 2, and push back the slide 3 until pin 14 drops into engagement with link 19 and hole 13.

While a specific construction of parts has been set forth, it is obvious that the combination may be varied without departing from the essential features of the invention.

By means of a car-coupling constructed as herein described the cars may be automatically coupled in an effective manner and with certainty.

Having thus described my invention, what I claim as new, and desire to secure by Letters Patent, is—

1. In a car-coupling, the hollow draw-bar 1, formed with projection 11, extending upward from its outer end and having hole 12 in line with hole 13 in casing 1, the slide 3, having friction-rollers 10 and guide-rod 4, and spring 8, located in said draw-bar, a bar, 17, adapted to move in slot 18 and connected by pivoted link 16' with lever 16, having teeth 15' and pivoted to bracket 15 on draw-bar 1, post 18', having pawl 17', engaging teeth 15', and the casing 22, having slot 23, through which projects lever 16, and hinged to draw-bar 1, substantially as described.

2. In a car-coupling, the combination of hollow draw-heads 1 2, with links 19, having projections 20 and coupling-pins 14, the draw-heads having upward projection 11, with hole 12 and coupling-pin hole 13, and containing slide 3, guide-rod 4, spring 8, and perforated end 6, containing the end of rod 4, and the draw-head 1, having slot 18 near its forward end, bar 17, adapted to slide in said slot, lever 16, pivoted to bracket 15 on draw-bar 1 and connected by link 16' with bar 17, and hinged casing 22, having slot 23, substantially as described.

JOHN M. CLARK.

Witnesses:
C. A. BEATTIE,
M. L. SHELDON.